Patented Mar. 30, 1954

2,673,871

UNITED STATES PATENT OFFICE 2,673,871

DIESTERPHOSPHITEAMIDES OF AMINOACID DERIVATIVES

George W. Anderson, Darien, Conn., assignor to American Cyanamid Company, New York, N. Y., a corporation of Maine No Drawing. Application December 1, 1950, Serial No. 198,730

15 Claims. (Cl. 260—461)

This invention relates to new organic compounds of phosphorus and methods of making the same. More particularly the invention relates to new diesterphosphiteamides of aminoacid derivatives.

An object of the invention is to make available a new class of organic compounds useful, for instance, as intermediates in the production of valuable solvents for paints, paint removers, paint brush cleaners, antioxidants, and reducing agents. The new class of compounds is also useful as intermediates in the preparation of amides or peptides as disclosed in my co-pending application, S. N. 198,729, now Patent No. 2,617,794, filed concurrently herewith. Another object of the invention is to provide suitable processes for the preparation of the new compounds. Other objects will appear hereinafter.

The new diesterphosphiteamides of aminoacid derivatives of this invention, which are also referred to simply as aminophosphites, may be more specifically illustrated by the following formula:

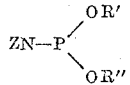

in which ZN is a radical derived from an aminoacid derivative and in which R' and R'' are the same or different non-functional organic radicals.

By non-functional organic radical, it is meant an organic radical used simply for the purpose of esterification and one which does not enter into the reaction whereby the aminophosphite is prepared, does not react with the aminophosphite after it is prepared and the variation of which does not appreciably affect the chemical properties of the aminophosphite. Examples of such radicals are: alkyl such as ethyl, propyl, butyl, octyl, and the like; aromatic such as phenyl, napthyl, tolyl, and the like; etc. It is believed that one skilled in the art of organic synthesis will have little difficulty selecting suitable radicals for R' and R''.

The new compounds of this invention may conveniently be prepared by reacting an aminoacid derivative having amine hydrogen with a compound such as represented by the formula:

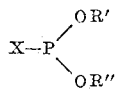

where X is halogen and R' and R'' are as defined above. These compounds are referred to in the specification and claims as halophosphites or as diesters of phosphorous halides. Because of the ease of preparation and reaction velocity, the chlorophosphites are the preferred halophosphites.

The aminoacid derivatives suitable for the process of this invention are prepared from an aminoacid having amine hydrogen by blocking the carboxy groups. The procedure of blocking a reactive group is well known in the art and, in the case of carboxy groups, may be done by esterification, or the equivalent. Examples of aminoacids, the derivatives of which are suitable, are as follows: aromatic aminoacids such as $NH_2$—$C_6H_4$—COOH, HOOC—$C_6H_3Cl$—NH—$CH_3$ and the like; aliphatic aminoacids such as

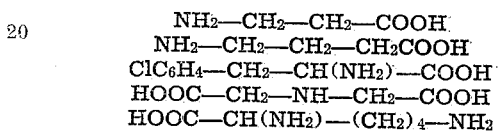

and the like; alicyclic aminoacids such as HOOC—$C_6H_{10}$—$NH_2$ and the like; heterocyclic aminoacids such as 3-pyrrolidinecarboxylic acid and the like. Derivatives of many other aminoacids are equally satisfactory and in fact, the only critical requirements of the aminoacid derivative is that it have amine hydrogen and have a basic dissociation constant greater than $1 \times 10^{-13}$ at 25° C.

The new compounds and process of this invention are of particular interest when a derivative of an aminoacid having an asymmetric carbon atom is employed, such as esters of the naturally occurring alpha aminoacids. Illustrative of the naturally occurring alpha aminoacids the derivatives of which are of particular interest in connection with the process of this invention are derivatives of the following: alanine, valine, norvaline, leucine, norleucine, isoleucine, isovaline, phenylalanine, tyrosine, serine, cysteine, methionine, aspartic acid, glutamic acid, lysine, ornithine, asparagine, citrulline, histidine, tryptophane, proline, hydroxyproline. Generally speaking, the naturally occurring aminoacids such as the above are alpha aminoacids having from two to twelve carbon atoms.

If the aminophosphites are prepared from aminoacid derivatives having more than one functioning group, i. e., groups having active hydrogen, enough halophosphite may, if desired, be employed to react with all of the active groups.

however, it is possible to use only one molecular equivalent of the halophosphite to form aminophosphites in which the radical represented by ZN in the general formula has other functioning groups. For instance, the monoaminophosphite of a diamine may be formed in this manner. Aminophosphites in which the radical represented by ZN in the general formula does contain a functioning group decompose at somewhat lower temperatures than otherwise because of an interaction of the functioning group with the aminophosphite itself, and if the aminophosphite is to be used as an intermediate, it is advisable to temporarily block the second functioning group of the aminoacid derivative by acylation before making the aminophosphite.

The reaction is conveniently performed in an anhydrous, inert, organic solvent. Examples of suitable solvents are: benzene, toluene, xylene or other aromatic hydrocarbons; chloroform or other halogenated aliphatics; normal octane or other aliphatic hydrocarbons; cyclohexane or other alicyclic hydrocarbon solvents; ethyl acetate or other of the lower aliphatic esters; ethyl ether or other lower aliphatic ethers; methyl butyl ketone or other lower aliphatic ketones; dioxane or other cyclic ethers, etc. Choice of solvent will depend principally upon convenience, but as the new class of compounds are useful primarily as intermediates, in many instances they may be utilized without isolation from the solvent and in such instances the intended use will affect the choice of solvent.

As halogen acid is formed during the reaction which tends to react with the free amine reactant, it is usually advantageous to have a halogen acid acceptor present in the reaction mixture. The preferred halogen acid acceptors are the tertiary amines such as triethylamine, tributylamine and the like.

The reaction proceeds readily at room temperature or at any other temperature below the decomposition temperature of the reaction product. As a matter of convenience one is usually limited to a range between the freezing and reflux temperatures of the solvent employed. Temperatures between 0° C. and 50° C. are preferred.

The reaction proceeds immediately upon mixing the two reactants as is evidenced, when a tertiary amine is present as a halogen acid acceptor, by a precipitate of amine hydrochloride. Even at very low temperatures, i. e., 0° C., the reaction is substantially complete in a very few minutes.

Generally speaking, the compounds of this invention are obtained as oils or waxy liquids, soluble in most organic solvents. They react with water, alcohols or other compounds having hydroxy groups to give esters of phosphorous acid.

The invention will be more particularly illustrated by the following specific examples:

*Example I*

Diethyl chlorophosphite (3.30 g.) is dissolved in about 25 cc. of anhydrous ether. The solution is chilled by means of an ice water bath and to the chilled solution is added 8.0 g. of DL-phenylalanine ethyl ester. After allowing the mixture to warm to room temperature, the precipitated DL-phenylalanine ethyl ester hydrochloride is removed by distillation and diethyl-$\alpha$-carbethoxy-$\beta$-phenylethylaminophosphite obtained as a colorless oil; boiling point about 145° C. at 0.2 mm. of mercury pressure; refractive index $n_D^{25}=1.4911$. The calculated phosphorus content of this compound is 9.88%; found by analysis, 9.67%.

*Example II*

To about 25 cc. of anhydrous ether there is added .02 mole of diethyl chlorophosphite. The solution is chilled by means of an ice water bath and to the chilled solution is added .02 mole of DL-phenylalanine ethyl ester and .02 mole of triethylamine. After allowing the mixture to warm to room temperature, the precipitate of triethylamine hydrochloride is removed by filtration, and the diethyl-$\alpha$-carbethoxy-$\beta$-phenylethylaminophosphite obtained according to the procedure of Example I is equally good yield.

*Example III*

Example II is repeated but employing .02 mole of DL-alanine ethyl ester in place of the DL-phenylalanine ethyl ester of Example II. The product, diethyl-$\alpha$-carbethoxyethylaminophosphite, distills at 78° C., at about 0.15 mm. pressure and has a refractive index of $n_D^{27}=1.435$.

*Example IV*

To about 25 cc. of anhydrous ether there is added .02 mole of DL-phenylalanine ethyl ester. The solution is chilled in an ice water bath and to the chilled solution is added .04 mole of triethylamine and .02 mole of dibutyl chlorophosphite. The precipitate of triethylamine hydrochloride is removed by filtration after allowing the mixture to warm to room temperature. Distillation of the ether solvent yields dibutyl-$\alpha$-carbethoxy-$\beta$-phenylethylaminophosphite as an oil which distills at 97° C.–100° C. at about 0.3 mm. pressure and has a refractive index of $$n_D^{26}=1.453.$$

*Example V*

Example IV is repeated but using .02 mole of diphenyl chlorophosphite in place of the dibutyl chlorophosphite of Example IV. The product, diphenyl - $\alpha$ - carbethoxy - $\beta$ - phenylethyl - aminophosphite is a gummy liquid soluble in most organic solvents.

*Example VI*

A suspension of 19.66 g. of glycylglycine ethyl ester hydrochloride in 200 cc. of anhydrous ether is chilled in an ice water bath. To the chilled solution is added 20.2 g. of triethylamine in 50 cc. of anhydrous ether. This is followed by the addition of 15.6 g. of diethyl chlorophosphite in 100 cc. of absolute ether over a period of five to ten minutes. The reaction mixture is allowed to warm to room temperature with stirring (approximately forty-five minutes). After filtering off the salts the ether solution is distilled to obtain about 16.4 g. of the glycylglycine derivative as an oil.

I claim:

1. Diesterphosphiteamides of aminoacid derivatives represented by the formula:

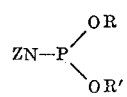

wherein ZN represents a substituted amino radical having a blocked carboxyl group, and R and R' represent hydrocarbon groups having not more than about 8 carbon atoms.

2. Diesterphosphiteamides of aminoacid amides represented by the formula:

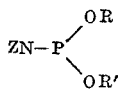

wherein ZN represents a substituted amino radical having a carboxyl amide group and R and R' are hydrocarbon groups having not more than about 8 carbon atoms.

3. Diesterphosphiteamides of peptide esters represented by the formula:

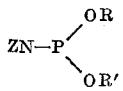

wherein ZN represents a substituted amino radical having a carboxyl ester group and at least one peptide linkage and R and R' represent hydrocarbon groups having not more than about 8 carbon atoms.

4. The diethylphosphiteamide of glycylglycine ethyl ester.

5. The diesterphosphiteamides of aminopropionic acid esters represented by the formula:

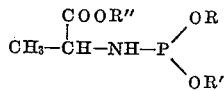

wherein —COOR'' represents a carboxyl ester group and R and R' are hydrocarbon groups having not more than about 8 carbon atoms.

6. Diethyl - alpha-carbethoxyethylaminophosphite.

7. Diesterphosphiteamides of alpha-amino-beta-phenylpropionic acid esters represented by the formula:

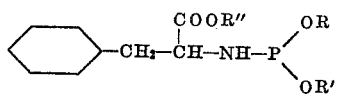

wherein —COOR'' represents a carboxyl ester group and R and R' represent hydrocarbon groups having not more than about 8 carbon atoms.

8. Diethyl - alpha - carbethoxy - beta - phenylethylaminophosphite.

9. Diphenyl - alpha - carbethoxy-beta-phenylethylaminophosphite.

10. Dibutyl - alpha - carbethoxy - beta-phenylethylaminophosphite.

11. A method of preparing diesterphosphiteamides represented by the formula:

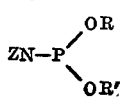

wherein ZN represents a substituted amino radical having a blocked carboxyl group and R and R' represent hydrocarbon groups having not more than about 8 carbon atoms, which comprises reacting an aminoacid having the carboxyl group blocked to prevent reaction, having amine hydrogen and having a basic dissociation constant greater than $1 \times 10^{-13}$ at 25° C., with a diester of phosphorous acid halide represented by the formula:

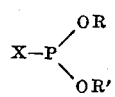

wherein X represents halogen and R and R' are as defined above.

12. The process of claim 11 wherein the diester of phosphorous acid halide is diethylchlorophosphite.

13. The process of claim 11 wherein the aminoacid derivative is an ester of an optically active alpha-aminoacid.

14. A process of preparing diesterphosphiteamides of aminoacid esters represented by the formula:

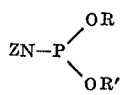

wherein ZN represents a substituted amino radical having a carboxyl ester group and R and R' are hydrocarbon groups having not more than about 8 carbon atoms, which comprises reacting, in the presence of a tertiary amine and in an organic solvent, an aminoacid ester of an optically active alpha-aminoacid having amine hydrogen, said aminoacid ester having a basic dissociation constant greater than $1 \times 10^{-13}$ at 25° C., with a diester of phosphorous acid chloride represented by the formula:

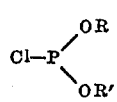

wherein R and R' are as defined above.

15. The process of claim 14 when said diester of phosphorous acid chloride is diethylchlorophosphite.

GEORGE W. ANDERSON.

References Cited in the file of this patent

Schechan: J. Am. Chem. Soc., vol. 72, pages 1312–1316 (1950).